(12) United States Patent
Bentley et al.

(10) Patent No.: US 7,948,706 B2
(45) Date of Patent: May 24, 2011

(54) APPARATUS AND METHOD TO ADJUST THE ORIENTATION OF A READ HEAD TO CORRECT FOR DYNAMIC SKEW

(75) Inventors: Steven Ross Bentley, Tucson, AZ (US); Nhan Xuan Bui, Tucson, AZ (US); Reed Alan Hancock, Tucson, AZ (US); Eiji Ogura, Yamato (JP); Kazuhiro Tsuruta, Yamato (JP); Keisuke Tanaka, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 12/482,312

(22) Filed: Jun. 10, 2009

(65) Prior Publication Data
US 2010/0315739 A1    Dec. 16, 2010

(51) Int. Cl.
*G11B 20/20* (2006.01)
(52) U.S. Cl. .......................................................... 360/76
(58) Field of Classification Search .......................... None
See application file for complete search history.

(56) References Cited

U.S. PATENT DOCUMENTS

| 5,488,525 | A | 1/1996 | Adams et al. |
|---|---|---|---|
| 6,088,180 | A | 7/2000 | Lee |
| 6,430,008 | B1 | 8/2002 | Trabert et al. |
| 6,700,729 | B1 | 3/2004 | Beck et al. |
| 7,342,738 | B1 * | 3/2008 | Anderson et al. .......... 360/77.12 |
| 7,764,460 | B2 * | 7/2010 | Bates et al. ............... 360/77.12 |
| 2007/0064329 | A1 | 3/2007 | Obara et al. |

* cited by examiner

*Primary Examiner* — K. Wong
(74) *Attorney, Agent, or Firm* — Dale F. Regelman; Quarles & Brady LLP

(57) ABSTRACT

A method to adjust the orientation of a read head comprising a first read element and a second read element, wherein the first read element and the second read element are separated by a distance, wherein the method moves a sequential information storage medium adjacent to the read head, determines a skew angle for the sequential information storage medium with respect to the read head using the first read element and the second read element, and encodes that skew angle in a computer readable medium.

17 Claims, 7 Drawing Sheets

APPARATUS AND METHOD TO ADJUST THE ORIENTATION OF A READ HEAD TO CORRECT FOR DYNAMIC SKEW

FIELD OF THE INVENTION

The invention is directed to a method to adjust the orientation of a read head to correct for dynamic skew of a sequential information storage medium being moved adjacent the read head.

BACKGROUND OF THE INVENTION

It is known in the art to save data in automated data storage libraries comprising a plurality of sequential information storage media, such as magnetic tapes, and one or more sequential information storage media drives. As the position of a sequential information storage medium varies with respect to a read head comprising a plurality of read elements, one or more read elements may not be able to detect the information encoded in the sequential information storage medium.

SUMMARY OF THE INVENTION

A method is presented to adjust the orientation of a read head comprising a first read element and a second read element, wherein the first read element and the second read element are separated by a distance. The method moves a sequential information storage medium adjacent to the read head, determines a skew angle for the sequential information storage medium with respect to the read head using the first read element and the second read element, and encodes that skew angle in a computer readable medium.

A read head is presented, wherein the read head comprises a microprocessor and a computer readable medium comprising computer readable program code disposed therein for servo control of the read head, wherein the read head further comprises a first read element and a second read element, wherein the first read element is separated from the second read element by a distance. The computer readable program code comprises a series of computer readable program steps to, when a sequential information storage medium is moved adjacent the read head, effect determining a skew angle for the sequential information storage medium with respect to the read using the first read element and the second read element, and encoding the skew angle in the computer readable medium.

A computer program product is presented. The computer program product is encoded in a computer readable medium, the computer program product being useable with a programmable computer processor for servo control of a read head comprising a first read element and a second read element, wherein the first read element is separated from the second read element by a distance. The computer program product comprises computer readable program code which, when a sequential information storage medium is moved adjacent the read head, causes the programmable processor to determine a skew angle for the sequential information storage medium with respect to the read head, using the first read element and the second read element, and computer readable program code which causes the programmable processor to encode the skew angle in a computer readable medium.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 8:
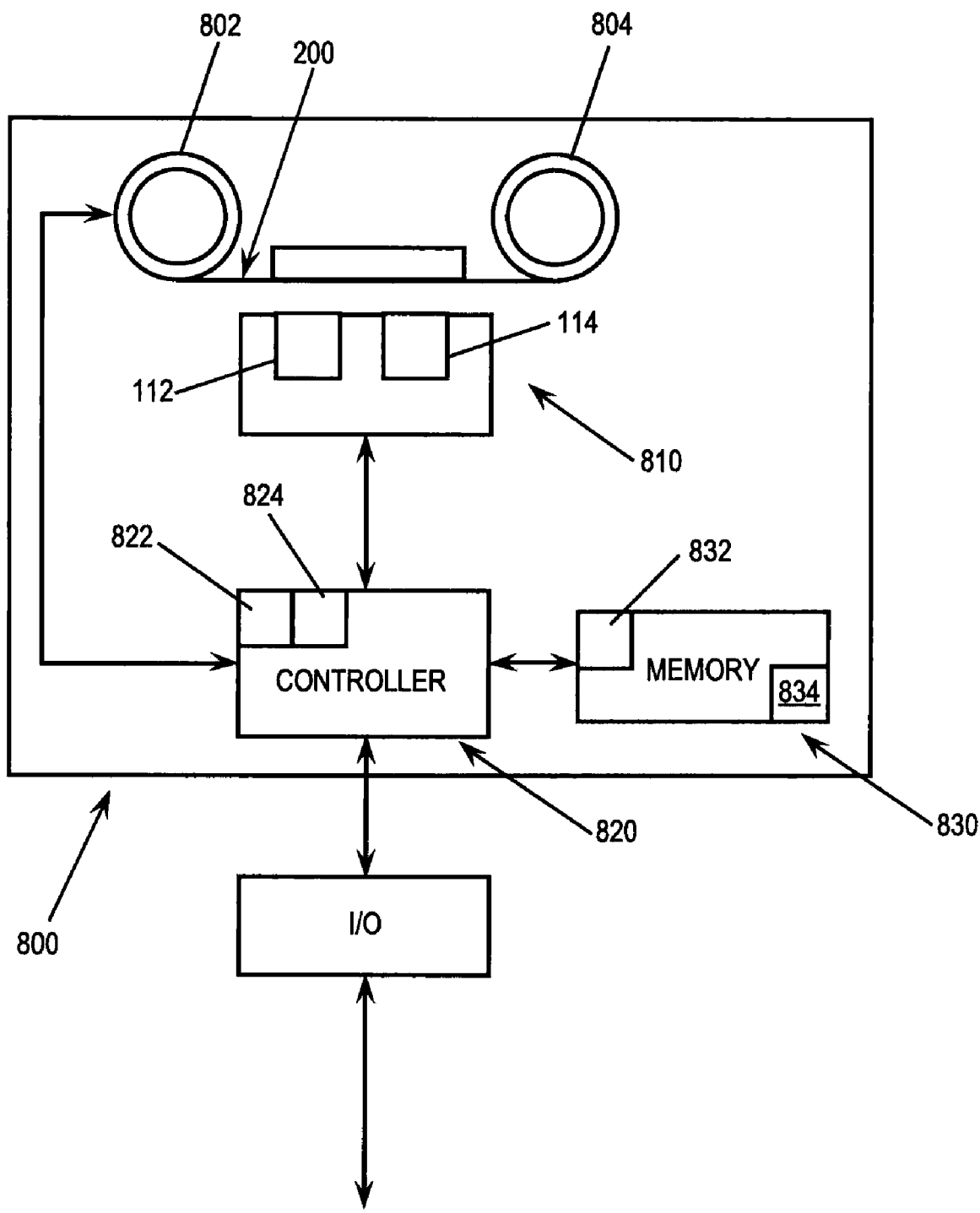
FIG. 8 is a block diagram illustrating Applicants' drive apparatus.

Referring now to FIG. 8, when writing data to a sequential information storage medium 200 (FIGS. 2, 3, 4, 5, 6, 8), such as a magnetic tape, a portion of the medium is disposed on a first rotatable reel, such as reel 802, and a portion of the medium is disposed on a second rotatable reel, such as reel 804. The rotatable reels are moved such that sequential information storage medium 200 is moved from one reel, adjacent read head 810, and onto to the other reel. Read head 810 a first read element 812 and a second read element 814. As those skilled in the art will appreciate, read head 810 may comprise other elements and components not shown in FIG. 8.

In the illustrated embodiment of FIG. 8, read head 810 is in communication with controller 820. In certain embodiments, controller 820 is integral with read head 810. Further in the illustrated embodiment of FIG. 8, controller comprises processor 822 and data buffer 824. Controller 820 is in communication with computer readable medium 830 and host I/O chip 840. Instructions 832 are encoded in computer readable medium 830.

In certain embodiments, computer readable medium 830 is integral with controller 820. In the illustrated embodiment of FIG. 8, reel 802, reel 804, read head 810, controller 820, and computer readable medium 830 are disposed within a drive apparatus 800. As those skilled in the art will appreciate, drive apparatus 800 may comprise other elements and components not shown in FIG. 8.

Figure 1:
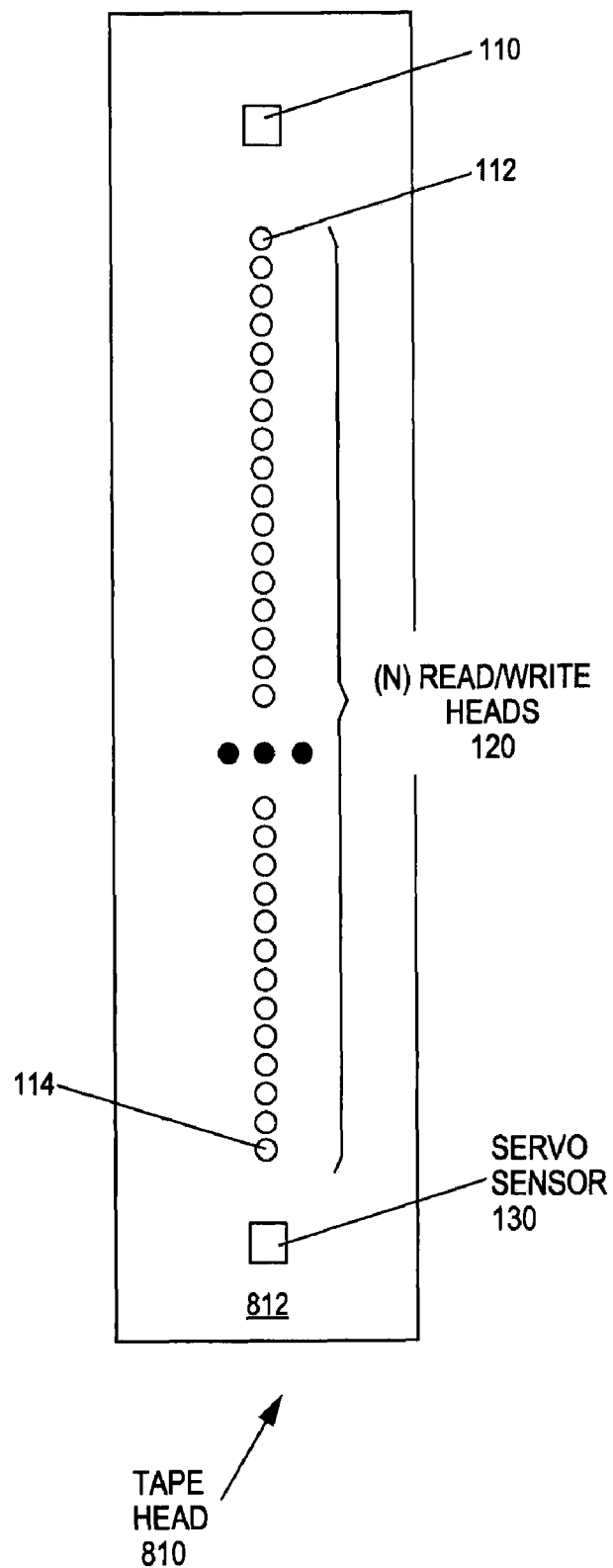
FIG. 1 is perspective view of Applicants' read head.
Figure 4:
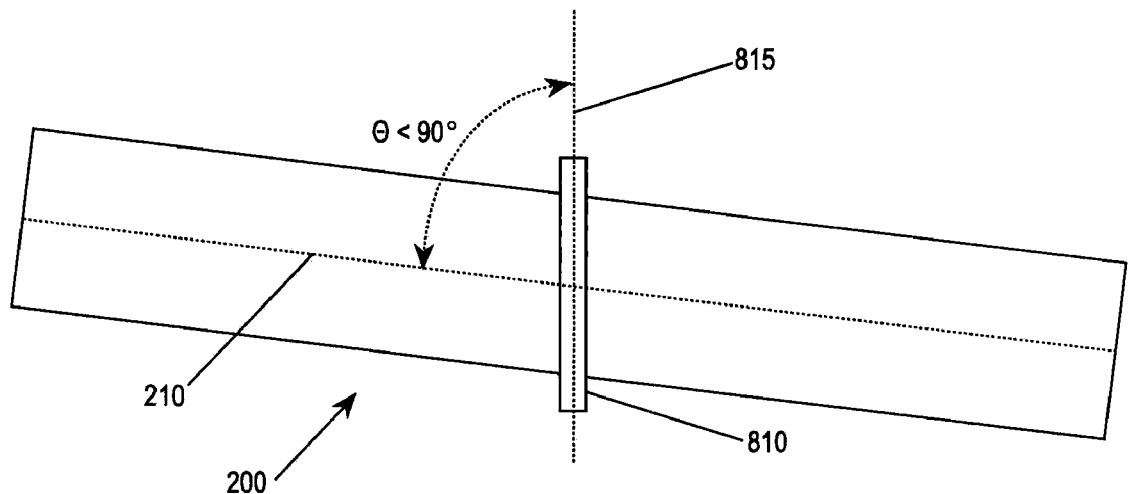
FIG. 4 is top view illustrating a sequential tape medium being moved adjacent Applicants' read head, wherein the movement of the medium is skewed in a second direction with respect to the read head.
Figure 5:
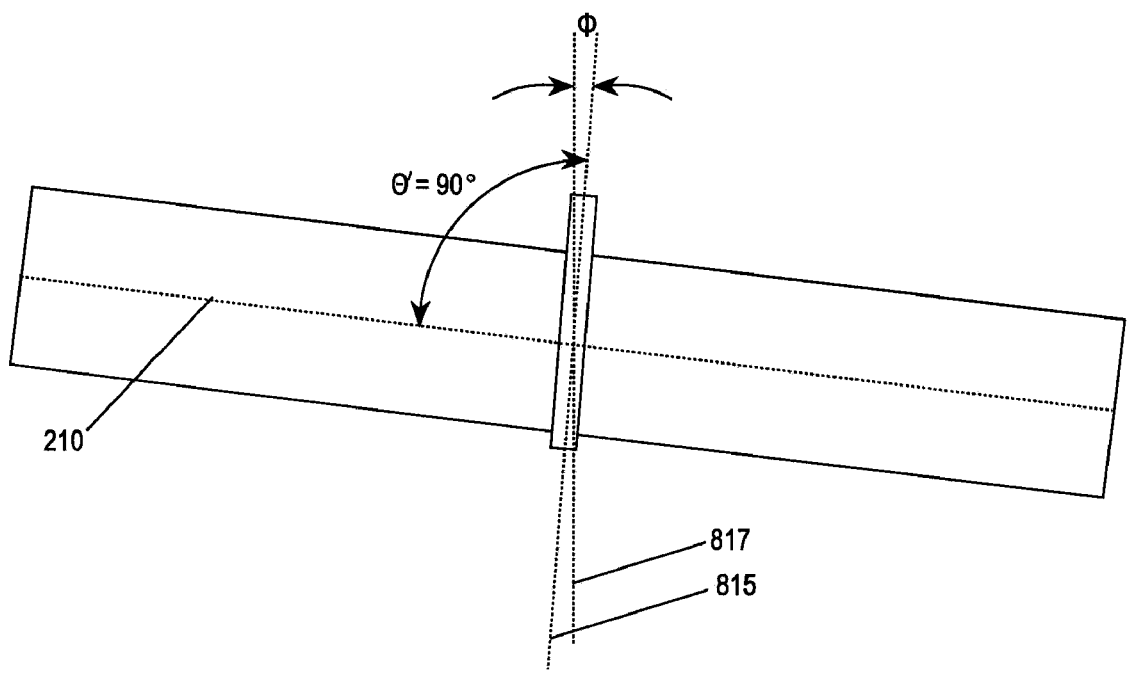
FIG. 5 illustrates the moving sequential information storage medium of FIG. 4 wherein the orientation of the read head has been adjusted to correct for the dynamic skew.
Figure 6:
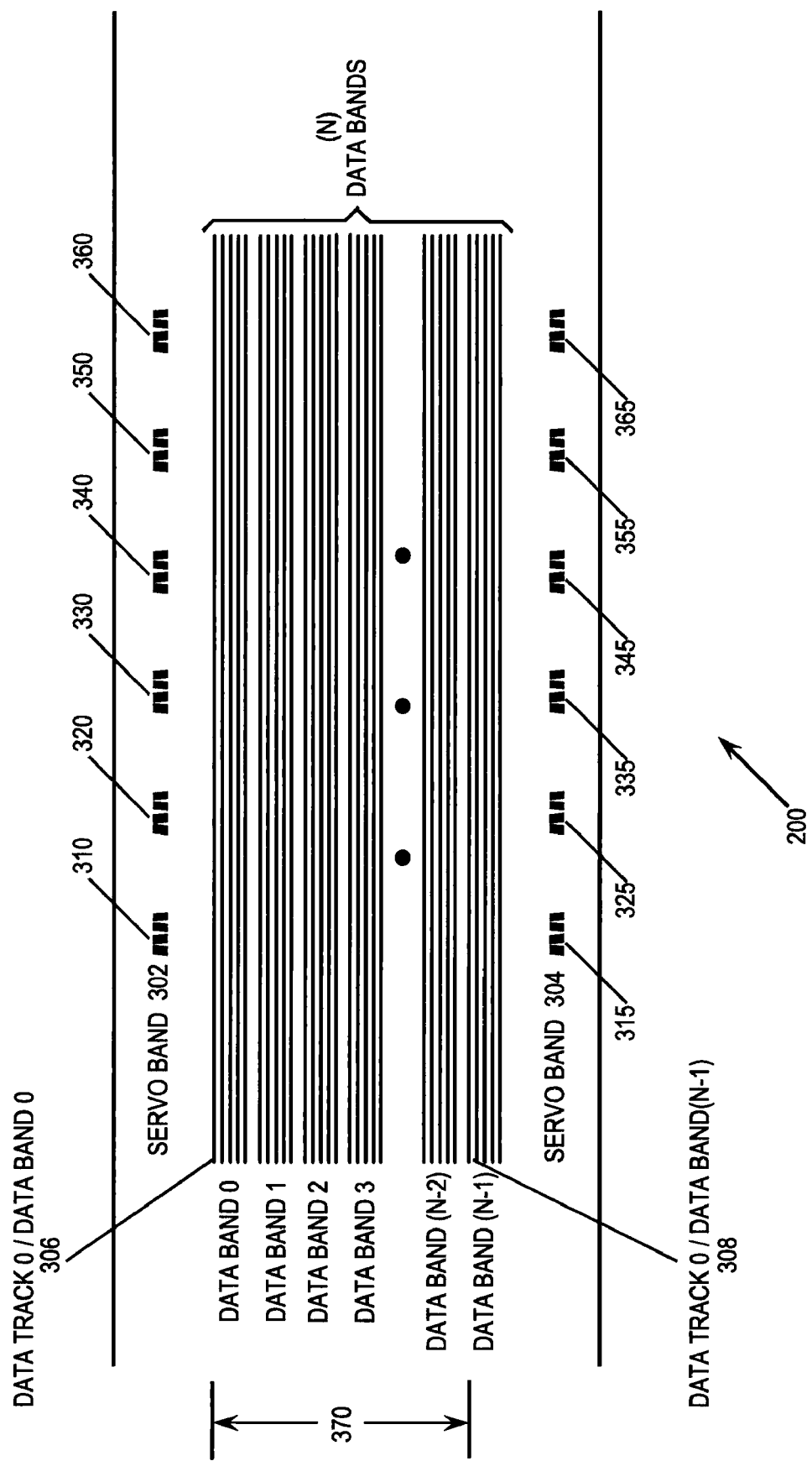
FIG. 6 is a block diagram showing Applicants' sequential information storage medium comprising two servo bands and (N) data bands, wherein each data band comprises a plurality of data tracks.

FIG. 1 illustrates surface 812 of read head 810 (FIGS. 1, 2, 3, 4, 5, 8), wherein surface 812 faces sequential information storage medium 200 (FIGS. 2, 3, 4, 5, 6, 8). In the illustrated embodiment of FIG. 1, surface 812 comprises (N) read heads 120 disposed between servo sensors 110 and 120. Referring now to FIGS. 1 and 6, servo sensors 110 and 120 detect servo patterns disposed in servo bands 302 and 304, respectively. Each of the (N) read heads 120 reads signals from a different one of (N) data bands written to sequential information storage medium 200. For example, read head 112 reads information encoded in a data track disposed in data band 0. Similarly, read head 114 reads information encoded in a data track disposed in data band (N-1).

Figure 2:
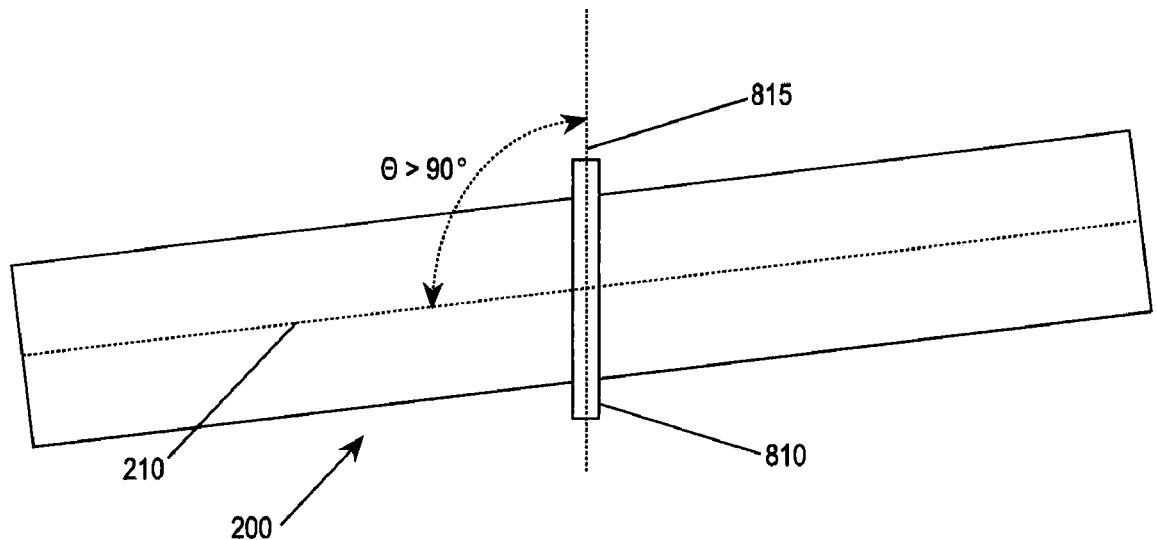
FIG. 2 is top view illustrating a sequential tape medium being moved adjacent Applicants' read head, wherein the movement of the medium is skewed in a first direction with respect to the read head.

Referring now to FIG. 2, sequential information storage medium 200 (FIGS. 2, 3, 4, 5, 6, 8) comprises a longitudinal axis 210 (FIGS. 2, 3, 4, 5), and read head 810 (FIGS. 1, 2, 3, 4, 5, 8) comprises a longitudinal axis 815. In the illustrated embodiment of FIG. 2, sequential information storage medium longitudinal axis 210 is not orthogonal to read head longitudinal axis 815. This being the case, sequential information storage medium 200 is "skewed" with respect to read head 810. Sequential information storage medium longitudinal axis 210 and read head longitudinal axis 815 define an angle Θ, wherein that angle Θ is greater than ninety degrees (90°). Angle Θ equals 90° plus skew angle Φ. In the illustrated embodiment of FIG. 2, sequential information storage medium 200 has a "positive skew" with respect to read head 810.

Figure 3:
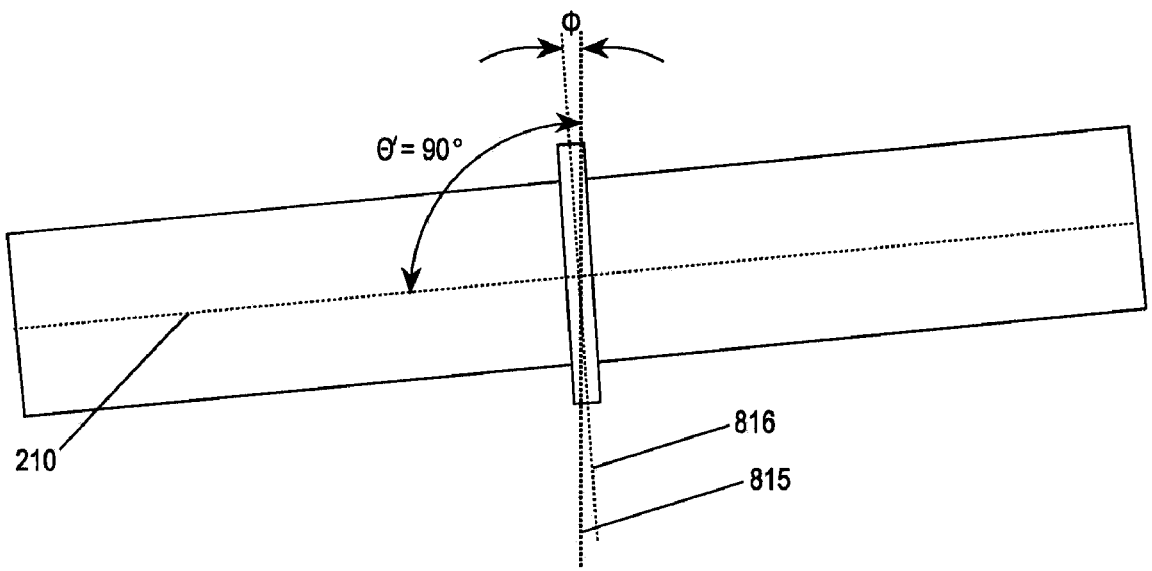
FIG. 3 illustrates the moving sequential information storage medium of FIG. 2 wherein the orientation of the read head has been adjusted to correct for the dynamic skew.

In the illustrated embodiment of FIG. 3, read head 810 has been rotated counterclockwise by skew angle Φ such that adjusted read head longitudinal axis 816 is orthogonal to sequential information storage medium longitudinal axis 210. In the illustrated embodiment of FIG. 3, sequential information storage medium longitudinal axis 210 and adjusted read head longitudinal axis 816 define an angle Θ', wherein that angle Θ' is equal to ninety degrees (90°).

Referring now to FIG. 4, sequential information storage medium 200 (FIGS. 2, 3, 4, 5, 6, 8) comprises a longitudinal axis 210, and read head 810 (FIGS. 1, 2, 3, 4, 5, 8) comprises a longitudinal axis 815. In the illustrated embodiment of FIG. 2, sequential information storage medium longitudinal axis 210 (FIGS. 2, 3, 4, 5) is not orthogonal to read head longitudinal axis 815. This being the case, sequential information storage medium 200 is "skewed" with respect to read head 810. Sequential information storage medium longitudinal axis 210 and read head longitudinal axis 815 define an angle Θ, wherein that angle Θ is less than ninety degrees (90°). Angle Θ equals 90° minus skew angle Φ. In the illustrated embodiment of FIG. 4, sequential information storage medium 210 has a "negative skew" with respect to read head 810.

In the illustrated embodiment of FIG. 5, read head 810 has been rotated clockwise by skew angle Φ such that adjusted read head longitudinal axis 817 is orthogonal to sequential information storage medium longitudinal axis 210. In the illustrated embodiment of FIG. 5, sequential information storage medium longitudinal axis 210 and adjusted read head longitudinal axis 817 define an angle Θ', wherein that angle Θ' is equal to ninety degrees (90°).

Figure 9:
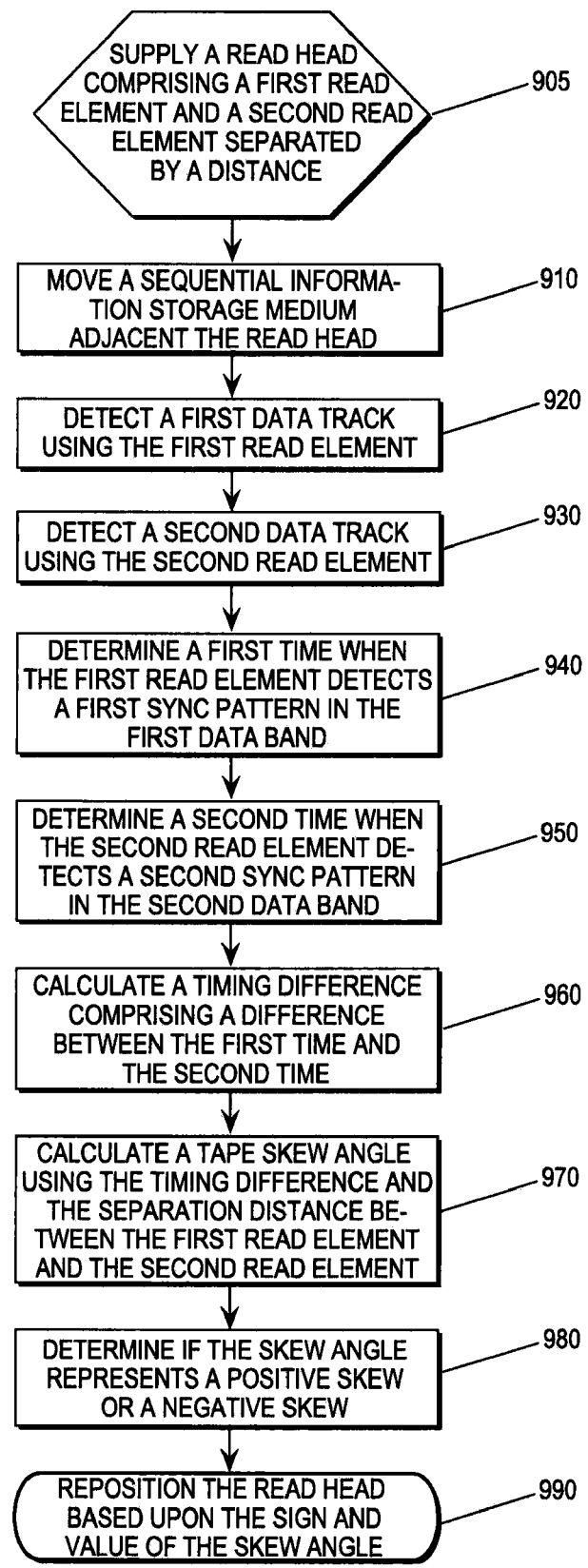
FIG. 9 is a flow chart summarizing Applicants' method.

Applicants' method comprises a method to calculate skew angle Φ. FIG. 9 summarizes Applicants' method. In step 905, the method provides a read head, such as read head 810, comprising a first read element, such as read element 112, and a second read element, such as read element 114, wherein the first read element and the second read element are separated by a distance, such as distance 370 (FIG. 6).

In step 910, the method moves a sequential information storage medium, such as sequential information storage medium 200, adjacent the read head of step 905. In certain embodiments, step 910 is performed by a controller, such as controller 820, in communication with the read head of step 905. In certain embodiments, step 910 is performed by a computing device in communication with the read head of step 905.

In step 920, the method detects a first data track, such as data track 306 (FIG. 6) using the first read element of step 905. In certain embodiments, step 920 is performed by a controller, such as controller 820, in communication with the read head of step 905. In certain embodiments, step 920 is performed by a computing device in communication with the read head of step 905.

In step 930, the method detects a second data track, such as data track 308, using the second read element of step 905. In certain embodiments, step 930 is performed by a controller, such as controller 820, in communication with the read head of step 905. In certain embodiments, step 930 is performed by a computing device in communication with the read head of step 905.

Referring now to FIGS. 1 and 6, Applicants' sequential information storage medium 200 comprises (N) data bands encoded parallel to longitudinal axis 210 (FIGS. 2, 4). Read head 810 is positioned using signals detected by servo sensors 110 and 120 using servo bands 302 and 308 such that each of (N) read heads 120 can detect information encoded in a data track disposed in a different one of the (N) data bands. For example, read head 810 is positioned such that a read head 112 can detect information encoded in a data track 306 written to a data track 0 in data band 0, and such that a read head 114 can detect information encoded in a data track 308 written to a data track 0 in data band (N-1).

In step 940, the method determines a first time when the first read element of step 905 detects a sync pattern written to the first data track. In certain embodiments, step 940 is performed by a controller, such as controller 820, in communication with the read head of step 905. In certain embodiments, step 940 is performed by a computing device in communication with the read head of step 905.

In step 950, the method determines a second time when the second read element of step 905 detects a sync pattern written to the second data track. In certain embodiments, step 950 is performed by a controller, such as controller 820, in communication with the read head of step 905. In certain embodiments, step 950 is performed by a computing device in communication with the read head of step 905.

Each data track encoded in Applicants' sequential information storage medium 200 comprises a "sync" pattern encoded therein, wherein that sync pattern precedes any actual data encoded in the data track. A controller, such as controller 824 (FIG. 8) uses such a sync pattern to adjust various read channel components prior to decoding actual data. In the illustrated embodiment of FIG. 7, Applicants' sync pattern comprises a series of alternating "1"s and "0"s.

Read element 112 detects a sync pattern encoded in data track 306, and read element 114 detects a sync pattern encoded in data track 308.

If Applicants' sequential information storage medium 200 is moved adjacent to Applicants' read head 810 such that skew angle Φ is zero, then read element 112 first detects a sync pattern encoded in data track 306 at the same time that read element 114 first detects a sync pattern encoded in data track 308. If read element 112 first detects a sync pattern encoded in data track 306 at a first time and read element 114 first detects a sync pattern encoded in data track 308 at a second time, wherein the first time precedes the second time, then the sequential information medium is moving past read head 810 at a negative skew angle Φ as illustrated in FIG. 4. If read element 114 first detects a sync pattern encoded in data track 308 at a first time and read element 112 first detects a sync pattern encoded in data track 306 at a second time, wherein the first time precedes the second time, then the sequential information medium is moving past read head 810 at a positive skew angle Φ as illustrated in FIG. 2.

In step 960, the method calculates a timing difference comprising a difference between the first time of step 940 and the second time of step 950. In certain embodiments, step 960 is performed by a controller, such as controller 820, in communication with the read head of step 905. In certain embodiments, step 960 is performed by a computing device in communication with the read head of step 905.

Figure 7:
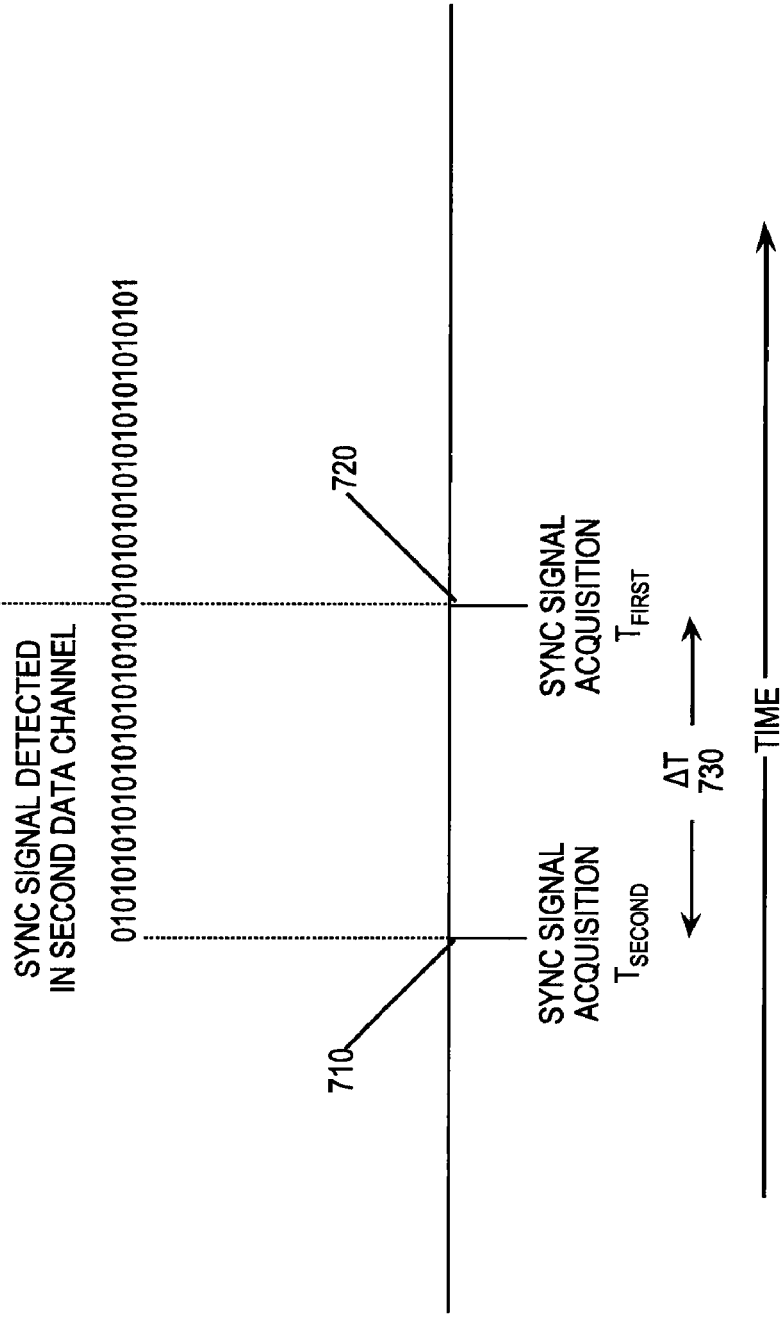
FIG. 7 illustrates timings when sync patterns encoded in two different data tracks are first detected at different times.

In the illustrated embodiment of FIG. 7, as Applicants' sequential information storage medium 200 is moved adjacent read head 810 at a velocity, read element 114 initially detects a sync pattern encoded in data track 308 at a first time 710, and read element 112 initially detects a sync pattern encoded in data track 306 at a second time 720, wherein the first time 710 precedes the second time 720. The time interval ΔT comprises a timing difference between time 710 and time 720. In the illustrated embodiment of FIG. 7 the sequential information storage medium 200 is being moved adjacent read head 810 with a negative skew angle Φ.

In step 970, the method calculates a skew angle Φ using the timing difference of step 960, the velocity at which the sequential information storage medium is moved past read head 810, and the separation distance of step 905. Using Equation (1), Applicants' method calculates a Relative Skew Distance as the multiplication product of the timing difference of step 960 and the velocity of sequential information storage medium movement.

$$\text{Relative Skew Distance} = (\Delta T)/(\text{velocity}) \quad (1)$$

A skew angle Φ is then calculated using Equation (2).

$$\text{Skew Angle } \Phi = \arcsin(\text{Relative Skew Distance}/(\text{Separation Distance 370})) \quad (2)$$

In certain embodiments, step 970 is performed by a controller, such as controller 820, in communication with the read head of step 905. In certain embodiments, step 970 is performed by a computing device in communication with the read head of step 905.

In step 980, the method determines if the skew angle of step 970 comprises a positive skew angle or a negative skew angle. In certain embodiments, step 980 further comprises saving both the magnitude of the skew angle Φ as determined in step 970, and the sign of the skew angle Φ determined in step 980. Referring once again to FIG. 8, the skew angle 834 is written to memory 830. Skew angle 834 is encoded in memory 830 indicating whether that skew angle 834 comprises a positive skew angle or a negative skew angle.

In certain embodiments, step 980 is performed by a controller, such as controller 820, in communication with the read head of step 905. In certain embodiments, step 980 is performed by a computing device in communication with the read head of step 905.

In step 990, if the method determines in step 980 that the skew angle of step 970 comprises a negative skew angle, then in step 990 the method rotates the read head of step 905 clockwise by the skew angle Φ such that an adjusted read head longitudinal axis 817 (FIG. 5) is orthogonal to sequential information storage medium longitudinal axis 210 (FIGS. 2, 3, 4, 5).

In step 990, if the method determines in step 980 that the skew angle of step 970 comprises a positive skew angle, then in step 990 the method rotates the read head of step 905 counterclockwise by the skew angle Φ such that an adjusted read head longitudinal axis 816 (FIG. 3) is orthogonal to sequential information storage medium longitudinal axis 210 (FIGS. 2, 3, 4, 5).

In certain embodiments, individual steps recited in FIG. 9 may be combined, eliminated, or reordered.

In certain embodiments, Applicants' invention includes instructions, such as instructions 832 (FIG. 8), residing in computer readable medium, such as for example computer readable medium 830 (FIG. 8), wherein those instructions are executed by a processor, such as processor 822 (FIG. 8), to perform one or more of steps 910, 920, 930, 940, 950, 960, 970, 980, and/or 990, recited in FIG. 9.

In other embodiments, Applicants' invention includes instructions residing in any other computer program product, where those instructions are executed by a computing device external to, or internal to, tape drive apparatus 800 (FIG. 8), to perform one or more of steps 910, 920, 930, 940, 950, 960, 970, 980, and/or 990, recited in FIG. 9. In either case, the instructions may be encoded in a computer readable medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to adjust the orientation of a read head to correct for dynamic skew, said read head comprising a first read element and a second read element separated by a distance, said method comprising:

moving a sequential information storage medium adjacent to said read head;

determining a first time, wherein said first read element initially detects a sync pattern comprising alternating 1s and 0s written to said first data track at said first time;

determining a second time, wherein said second read element initially detects a sync pattern comprising alternating 1s and 0s written to said second data track at said second time;

calculating a timing difference comprising the difference between said first time and said second time;

setting a skew angle using said timing difference;

encoding said skew angle in a computer readable medium.

2. The method of claim 1, wherein said sequential information storage medium comprises a first data track and a second data track, said method further comprising:

detecting said first data track using said first read element;
detecting said second data track using said second read element.

3. The method of claim 1, wherein:
said tape is moved past said read head at a velocity;
said setting step further comprises calculating said skew angle using said distance, said timing difference, and said velocity.

4. The method of claim 1, wherein:
said read head comprises a read head longitudinal axis; and
said sequential information storage medium comprises a sequential information storage medium longitudinal axis;
said method further comprising:
determining if an angle defined by said sequential information storage medium longitudinal axis and said read head longitudinal axis is greater than ninety degrees;
operative if an angle defined by said sequential information storage medium longitudinal axis and said read head longitudinal axis is greater than ninety degrees, determining that said skew angle comprises a positive skew angle.

5. The method of claim 4, further comprising:
determining if an angle defined by said sequential information storage medium longitudinal axis and said read head longitudinal axis is less than ninety degrees;
operative if an angle defined by said sequential information storage medium longitudinal axis and said read head longitudinal axis is less than ninety degrees, determining that said skew angle comprises a negative skew angle.

6. The method of claim 5, further comprising:
operative if said skew angle comprises a positive skew angle, rotating said read head counterclockwise; and
operative if said skew angle comprises a negative skew angle, rotating said read head clockwise.

7. A read head comprising a microprocessor and a non-transitory computer readable medium comprising computer readable program code disposed therein to adjust the orientation of the read head to correct for dynamic skew, the read head comprising a first read element and a second read element, wherein the first read element is separated from the second read element by a distance, the computer readable program code comprising a series of computer readable program steps to effect:
when a sequential information storage medium is moved adjacent said read head, determining a skew angle for said sequential information storage medium with respect to said read using said first read element and said second read element;
determining a first time, wherein said first read element initially detects a sync pattern comprising alternating 1s and 0s written to said first data track at said first time;
determining a second time, wherein said second read element initially detects a sync pattern comprising alternating 1s and 0s written to said second data track at said second time;
calculating a timing difference comprising the difference between said first time and said second time;
setting said skew angle using said timing difference;
encoding said skew angle in said computer readable medium.

8. The read head of claim 7, wherein said sequential information storage medium comprises a first data track and a second data track, said computer readable program code further comprising a series of computer readable program steps to effect:
detecting said first data track using said first read element;
detecting said second data track using said second read element.

9. The read head of claim 7, wherein:
said tape is moved past said head at a velocity;
said computer readable program code to set said skew angle further comprises a series of computer readable program steps to effect calculating said skew angle using said distance, said timing difference, and said velocity.

10. The read head of claim 7, wherein
said read head comprises a read head longitudinal axis;
said sequential information storage medium comprises a sequential information storage medium longitudinal axis;
said computer readable program code to set said skew angle further comprises a series of computer readable program steps to effect:
determining if an angle defined by said sequential information storage medium longitudinal axis and said read head longitudinal axis is greater than ninety degrees;
operative if an angle defined by said sequential information storage medium longitudinal axis and said read head longitudinal axis is greater than ninety degrees, determining that said skew angle comprises a positive skew angle.

11. The read head of claim 10, said computer readable program code to set said skew angle further comprises a series of computer readable program steps to effect:
determining if an angle defined by said sequential information storage medium longitudinal axis and said read head longitudinal axis is less than ninety degrees;
operative if an angle defined by said sequential information storage medium longitudinal axis and said read head longitudinal axis is less than ninety degrees, determining that said skew angle comprises a negative skew angle.

12. The read head of claim 11, said computer readable program code further comprising a series of computer readable program steps to effect:
operative if said skew angle comprises a positive skew angle, rotating said read head counterclockwise; and
operative if said skew angle comprises a negative skew angle, rotating said read head clockwise.

13. A computer program product encoded in a non-transitory computer readable medium, said computer program product being useable with a programmable computer processor to adjust the orientation of a read head to correct for dynamic skew, the read head comprising a first read element and a second read element separated by a distance, comprising:
computer readable program code which, when a sequential information storage medium is moved adjacent said read head, causes said programmable processor to determine a skew angle for said sequential information storage medium with respect to said read head using said first read element and said second read element;
computer readable program code which causes said programmable processor to determining a first time, wherein said first read element initially detects a sync pattern comprising alternating 1s and 0s written to said first data track at said first time;
computer readable program code which causes said programmable processor to determining a second time, wherein said second read element initially detects a sync pattern comprising alternating 1s and 0s written to said second data track at said second time;
computer readable program code which causes said programmable processor to calculating a timing difference comprising the difference between said first time and said second time;
computer readable program code which causes said programmable processor to setting said skew angle using said timing difference;

computer readable program code which causes said programmable processor to encode said skew angle in a computer readable medium.

14. The computer program product of claim 13, wherein:
said tape is moved past said read head at a velocity;
said computer readable program code to set said skew angle further comprises computer readable program code which causes said programmable processor to calculate said skew angle using said distance, said timing difference, and said velocity.

15. The computer program product of claim 13, wherein said read head comprises a read head longitudinal axis; and
said sequential information storage medium comprises a sequential information storage medium longitudinal axis;
further comprising:
computer readable program code which causes said programmable processor to determine if an angle defined by said sequential information storage medium longitudinal axis and said read head longitudinal axis is greater than ninety degrees; and
computer readable program code which, if said angle defined by said sequential information storage medium longitudinal axis and said read head longitudinal axis is greater than ninety degrees, causes said programmable processor to determine that said skew angle comprises a positive skew angle.

16. The computer program product of claim 15, further comprising:
computer readable program code which causes said programmable processor to determine if an angle defined by said sequential information storage medium longitudinal axis and said read head longitudinal axis is less than ninety degrees; and
computer readable program code which, if said angle defined by said sequential information storage medium longitudinal axis and said read head longitudinal axis is less than ninety degrees, causes said programmable processor to determine that said skew angle comprises a negative skew angle.

17. The computer program product of claim 16, further comprising:
computer readable program code which, if said skew angle comprises a positive skew angle, causes said programmable processor to rotating said read head counterclockwise;
computer readable program code which, if said skew angle comprises a negative skew angle, causes said programmable processor to rotate said read head clockwise.

* * * * *